No. 654,492. Patented July 24, 1900.
E. S. ROSS.
HANDLE FOR CONVERTING KEROSENE TINS OR THE LIKE INTO BUCKETS.
(Application filed Apr. 12, 1900.)
(No Model.)

Witnesses:— Inventor:

UNITED STATES PATENT OFFICE.

ERNEST SYDNEY ROSS, OF HOBART, TASMANIA.

HANDLE FOR CONVERTING KEROSENE-TINS OR THE LIKE INTO BUCKETS.

SPECIFICATION forming part of Letters Patent No. 654,492, dated July 24, 1900.

Application filed April 12, 1900. Serial No. 12,613. (No model.)

*To all whom it may concern:*

Be it known that I, ERNEST SYDNEY ROSS, a subject of the Queen of Great Britain and Ireland, residing at Hobart, in the Colony of Tasmania, have invented certain new and useful Improvements in Handles for Converting Kerosene-Tins or the Like into Buckets; and I do hereby declare the following to be a full, clear, and exact description of the invention, such as will enable others skilled in the art to which it appertains to make and use the same.

The object of this invention is to provide an appliance which is adapted to be used as a handle by which to support or carry kerosene-tins and the like. The appliance has means for cutting off or making an aperture in the top of the tin and for perforating the holes at opposite sides thereof, by which the handle ends will be supported. It is thus a complete means for enabling any such tin to be converted into a bucket or the like. The whole appliance is, as a general rule, manufactured of one piece of metal, and it is therefore extremely cheap. Its body assumes the form of a rod or bar of any desired section or sections, and at one or both ends there will be provided one or more holes through which a split pin (or in some cases an ordinary nail) may be inserted, so as to prevent the handle from becoming loose or slipping out when in use, or some equivalent stop is provided. At one end of the appliance is a projection of suitable form set transversely to the length and pointed, so that it may be driven into the side of the tin (to make holes for the handle) at any desired points, and the section of this projection is at one part the same as the section of the part of the appliance which is to pass through the said holes. At the same end as the projection there is also a projecting blade having one or both edges sharp. This is used to open the can, the projection by which the holes are made being used as a fulcrum. After the handle is in place the cutting projection may be snapped off or otherwise removed, so as to avoid that projection where it is found to be inconvenient. To facilitate this, the cutter may be weakened at the point where snapping off would be desirable.

In order that the invention may be better understood, reference is made to the attached drawings, in which—

Figure 1:
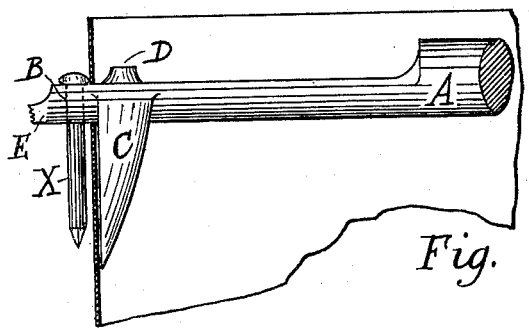
Figure 4:
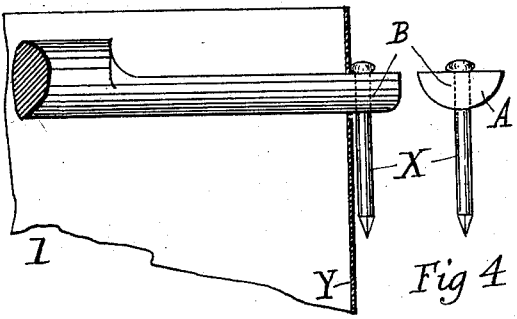
Figure 2:
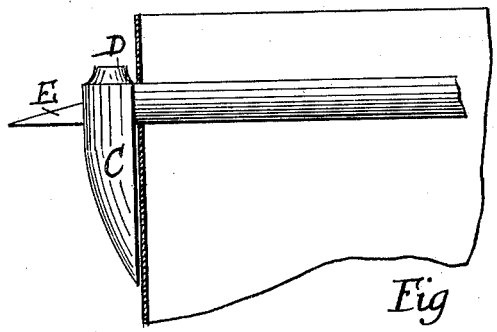
Figure 5:
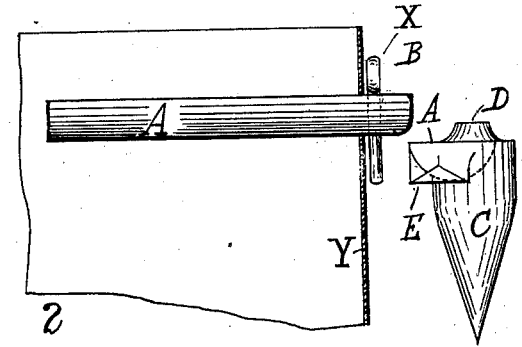
Figure 3:
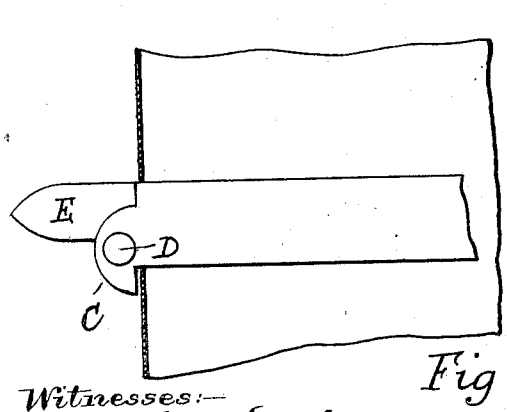
Figure 6:
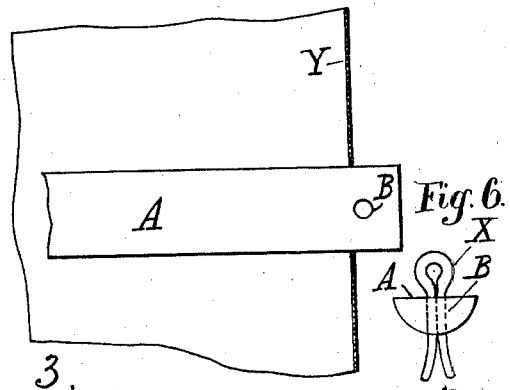

Figure 1 is a side elevation showing the appliance in position as a handle, the upper part of a kerosene-tin being shown. Fig. 2 is a side elevation showing a modification of the appliance, also in position as a handle. Fig. 3 is a plan view of the appliance in Fig. 2. Fig. 4 is an end view of the end of the appliance nearest it in Fig. 1. Fig. 5 is an end view of the end of the appliance most remote from it in Fig. 2. Fig. 6 is an end view of the end of the appliance nearest it in Fig. 3.

In the figures, A indicates the body of the appliance, which may be of one section only, as in Fig. 2, or the center may be rounded, as in Fig. 1.

B is a hole in one or each end, as shown, into which a nail or split pin X or the like may be inserted to act as a stop against the handle getting free from the tin Y.

C is a pointed projection which has a part with the same section as the body A has where the said body passes through the holes made in the sides of the tin by projection C.

In order to insert the handle in the can, the can may be struck at the desired point with the sharp projection C, and, if necessary, additional force may be applied upon the head D until the hole is large enough to admit the end of the handle A.

E is a knife or cutting projection so situated that when the cutting operation is proceeding the projection C is used as a fulcrum. The positions of this fulcrum and of the cutting projection relatively to the body A and to each other may be modified, so long as the spirit of the invention is adhered to.

What I claim as my invention, and desire to secure by Letters Patent of the United States, is—

1. As an article of manufacture, a device for the purposes specified, consisting of a rod or body portion provided at one end with a perforation, and at its other end with a similar perforation, and a sharp tapered projection disposed transversely of said rod and integral therewith, substantially as described.

2. As an article of manufacture, a device for the purposes specified, consisting of a rod or body portion provided at one end with a perforation, and at its opposite end with a sharp tapered projection disposed transversely of said rod, and a cutting-blade projecting from said projection in a direction longitudinally of said rod, substantially as described.

In testimony whereof I have signed this specification in the presence of two subscribing witnesses.

ERNEST SYDNEY ROSS.

Witnesses:
A. S. BUTLER,
W. E. MASTERS.